United States Patent
Cardelius et al.

(10) Patent No.: US 7,031,861 B2
(45) Date of Patent: Apr. 18, 2006

(54) APPARATUS AND METHOD FOR CALIBRATING A RESISTANCE THERMOMETER AND GAS ANALYZER EMPLOYING SAME

(75) Inventors: Erik Cardelius, Stockholm (SE); Åke Larsson, Järfäalla (SE); Lars Skoglund, Sollentuna (SE)

(73) Assignee: Maquet Critical Care AB, Solna (SE)

( * ) Notice: Subject to any disclaimer, the term of this patent is extended or adjusted under 35 U.S.C. 154(b) by 0 days.

(21) Appl. No.: 10/790,587

(22) Filed: Mar. 1, 2004

(65) Prior Publication Data

US 2004/0204884 A1    Oct. 14, 2004

(30) Foreign Application Priority Data

Mar. 26, 2003   (SE)   ..................... 0300847

(51) Int. Cl.
*G01K 15/00* (2006.01)
(52) U.S. Cl. ...................... 702/99; 73/25.03
(58) Field of Classification Search ............... 702/99; 73/25.03, 24.01, 1.16, 861.28; 374/117; 376/247; 377/25; 600/549
See application file for complete search history.

(56) References Cited

U.S. PATENT DOCUMENTS

| | | | |
|---|---|---|---|
| 4,123,934 A * | 11/1978 | Hoht | 73/25.03 |
| 4,623,264 A * | 11/1986 | Mitchell | 374/117 |
| 4,795,884 A | 1/1989 | Carroll | |
| 4,876,889 A | 10/1989 | Shakkottai et al. | |
| 6,209,387 B1 | 4/2001 | Savidge | |
| 2003/0136200 A1 | 7/2003 | Cardelius et al. | |

FOREIGN PATENT DOCUMENTS

| | | |
|---|---|---|
| GB | 2 256 051 | 11/1992 |
| SU | 857 744 | 8/1981 |

* cited by examiner

*Primary Examiner*—John Barlow
*Assistant Examiner*—Xiuqin Sun
(74) *Attorney, Agent, or Firm*—Schiff Hardin LLP

(57) ABSTRACT

In a calibration apparatus and method for a resistance thermometer a reference thermometer is located in thermal contact with a gas composition to generate, during a calibration period, a first reference temperature value for the gas composition at a first temperature, and an acoustic meter is located in acoustic contact with the gas composition and, during the calibration period, makes an acoustic velocity-related measurement for use in generating a second reference temperature value for the gas composition at a second temperature. A calibration unit coordinates the first and second reference temperature values with first and second measurement temperature values provided by the resistance thermometer at the first and the second temperatures, respectively, and establishes a calibration relationship therefrom.

4 Claims, 1 Drawing Sheet

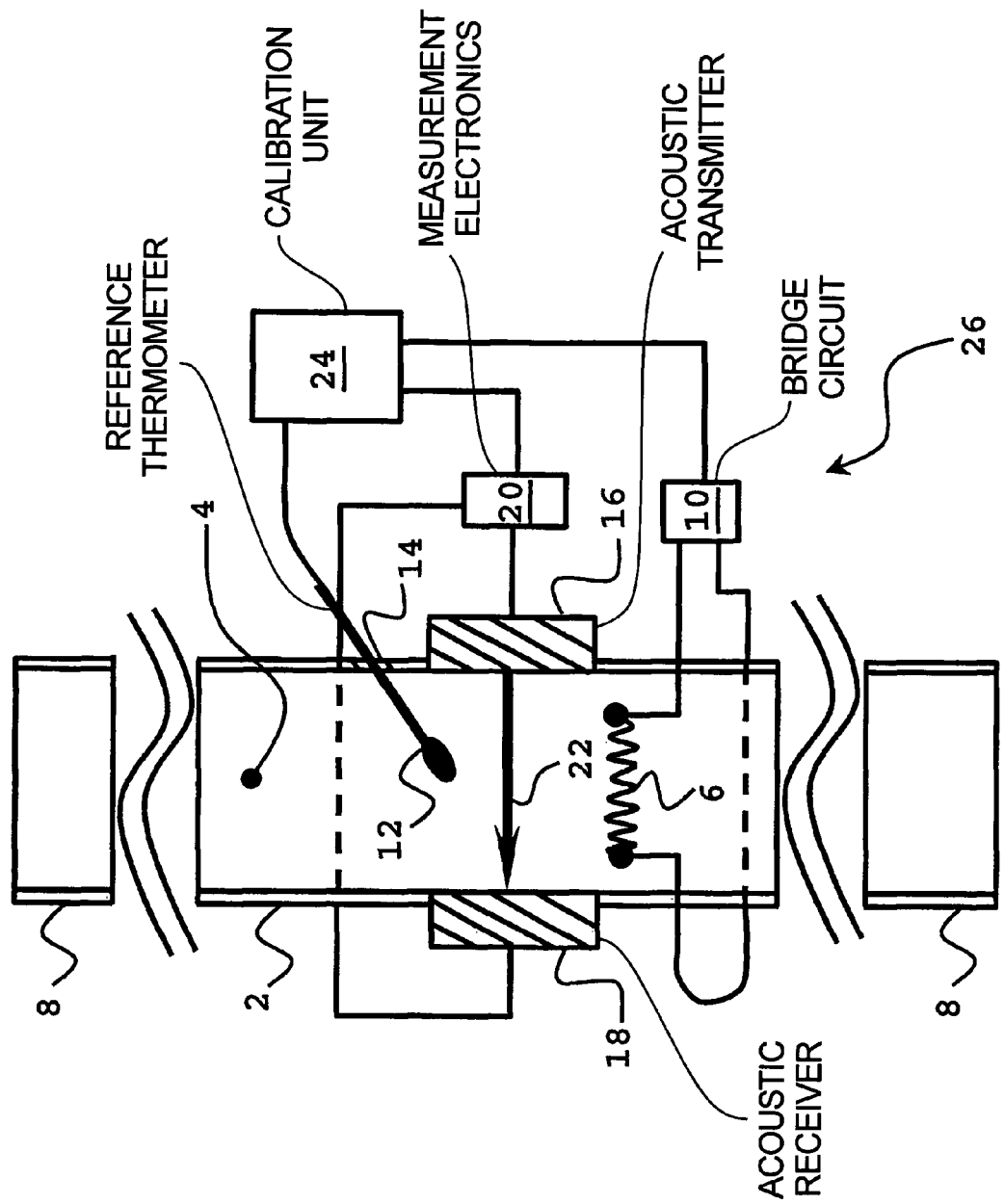

APPARATUS AND METHOD FOR CALIBRATING A RESISTANCE THERMOMETER AND GAS ANALYZER EMPLOYING SAME

BACKGROUND OF THE INVENTION

1. Field of the Invention

The present invention relates to an apparatus for and a method for calibrating a resistance thermometer, particularly a resistance thermometer of the type having a thermally sensitive resistance element in operable connection with a bridge measurement circuit used to measure gas temperatures in a gas composition analyzer.

2. Description of the Prior Art

Resistance thermometers, for example ones employing a thin platinum wire as a thermally sensitive resistance element, are well known in the art. The electrical bridge circuit to which such an element is operably connected usually configured so that a thermally induced electrical resistance change of the resistance element produces a linearly dependent change in an electrical parameter of the circuit, such as voltage or current. This parameter is then supplied as a measure of the temperature sensed by the resistance element.

In order to ensure that the resistance thermometer provides an accurate indication of a temperature to be measured it should be calibrated at least once, preferably on a number of occasions, during its operation. The typical calibration procedure which is followed is a multi-point, normally two point, calibration where the output from the bridge circuit is recorded at several known reference temperatures. Often a calibrated reference thermometer is located in thermal contact with a system, the temperature of which is to be monitored by the resistance thermometer, and used to provide the reference temperatures against which the resistance thermometer is calibrated.

Such a calibration procedure, even using only two points, is not trivial since the system, the resistance element and the reference thermometer must be allowed to come into thermal equilibrium before each calibration point is recorded. This results in a relatively lengthy calibration procedure.

SUMMARY OF THE INVENTION

An object of the present invention is to provide an apparatus for and a method for calibrating a resistance thermometer for use in monitoring a gas temperature using a more rapid two-point calibration procedure.

The above object is achieved in accordance with the present invention in a calibration apparatus for a resistance thermometer having a reference thermometer locatable in thermal contact with a gas composition to generate a first reference temperature value for the gas composition at a first temperature, and an acoustic meter locatable in acoustic contact with the gas composition and adapted to make an acoustic velocity-related measurement for use in generating a second reference temperature value for the gas composition at a second temperature.

By employing a combination of a direct reference temperature measurement for generating the first reference temperature value as a first temperature calibration point and an acoustic velocity related measurement for generating the second reference temperature value as a second temperature calibration point then the system needs only to be in equilibrium when establishing the first temperature calibration point. Thus the duration of the calibration procedure is reduced.

Preferably, an acoustic velocity-related measurement also is made within the gas for which the first reference temperature value is generated and employed in combination with the other acoustic velocity related measurement in the generation of the second reference temperature value. This permits an unknown acoustic path length and/or a gas of unknown composition to be used in the calibration procedure, since the unknown value or the relationship between the unknown values can be determined from the acoustic velocity-related measurement within the gas for which the first reference temperature value is generated.

A gas composition analyzer employing a resistance thermometer and an acoustic meter for the determination of information relating to the composition of a gas and including a calibration apparatus according to the present invention may be provided. Advantages that are associated with the apparatus are therefore inherently associated with the analyzer. Moreover, elements, such as the acoustic meter, are specifically designed to perform both gas analysis and thermometer calibration functions to thereby reduce component costs.

The above object also is achieved in accordance with the present invention in a method for calibrating a resistance thermometer including the steps of using a reference thermometer to obtain a first reference temperature value for a gas composition at a first temperature, as well as a first measurement temperature value, using an acoustic meter to obtain an acoustic velocity-related measurement value for use in determining a second reference temperature value for the gas composition at a second temperature, as well as a second measurement temperature value, using the resistance thermometer to obtain a second measurement temperature value, and supplying the first reference temperature value, the first measurement temperature value, the second reference temperature value and the second measurement temperature value to a calibration unit and calculating, in the calibration unit, a relationship from the first and second reference temperature values and the first and second measurement temperature values for calibrating the resistance thermometer.

DESCRIPTION OF THE DRAWINGS

The FIGURE illustrates an apparatus and analyzer according to the present invention.

DESCRIPTION OF THE PREFERRED EMBODIMENTS

In the apparatus shown in the FIGURE, a measurement cell 2 is provided having an internal flow conduit 4 for the through flow of a gas composition the temperature of which is to be measured by means of a platinum wire resistance element 6. The measurement cell 2 may, as illustrated in the FIGURE, be an integral part of a pneumatic circuit, which is shown generally at 8 or may be a separate unit capable of gas connection to such a circuit 8.

The platinum wire resistance element 6 is located within the flow conduit 4 and is in electrical connection with a bridge circuit 10 of known construction. The element 6 and the bridge circuit 10 together form a known platinum resistance thermometer, the output of which is to be calibrated using the apparatus according to the present invention.

An element of the apparatus is a reference thermometer 12, such as a known thermo-element or PT100-based measurement instrument, which in the present embodiment may be introduced into the internal flow conduit 4 through an externally accessible gas-tight seal 14 within the measurement chamber. The apparatus also includes an acoustic transmitter 16/receiver 18 arrangement that, together with associated control and measurement electronics 20, form an acoustic meter of known construction. In the present example the acoustic transmitter/receiver arrangement 16,18 is shown as separate devices located directly facing one another across the measurement cell 2. It will be appreciated that other known configurations of a separate transmitter device 16 and receiver device 18 as well as an acoustic transceiver element may be employed to delimit an acoustic path 22 through gas within the cell 2. In the present embodiment a separate calibration unit 24 is also provided as an element of the apparatus. This unit 24 may be realized in a suitably programmed microcomputer having appropriate known interface devices connected thereto for appropriately conditioning incoming and/or outgoing signals.

During a first phase of a calibration procedure, the calibration unit 24 receives a signal from the reference thermometer 12 as a first reference temperature value, which is indicative of an equilibrium temperature of a gas composition within the flow conduit 4 of the measurement cell 2. Since the temperature measured is an equilibrium temperature, a reference thermometer 12 having a relatively long time constant may be used. The calibration unit 24 also receives during this first phase an output signal from the resistance thermometer 6,10 as a first temperature measurement value and stores, for example in an associated digital memory, the two first values in a referenced fashion.

During a second phase of the calibration procedure, which is carried out at a second, non-equilibrium, temperature of the gas composition, the calibration unit 24 receives from the acoustic meter 16,18,20 a signal related to an acoustic velocity within the gas composition. This signal, for example, may be an actual velocity value or a transit time value for acoustic energy emitted by the transmitter 16 to traverse the acoustic path 22 and be received by the receiver 18, the latter being provided particularly if the length L of the acoustic path 22 is unknown. The calibration unit 24, for example, may be configured to provide a trigger signal to the control and measurement electronics 20 to initiate transmission of acoustic energy from the transmitter 16 and to start a timer which stops upon notification of receipt of the transmitted energy by the receiver 18. Interrogation of such a timer will thus provide a measure of the transit time t as is well known in the art. As an alternative, other known acoustic velocity measurement techniques may be employed to provide the appropriate acoustic velocity related signal.

The speed of sound V in a gas composition is described by the known equation:

$$V=K\sqrt{T} \quad (1)$$

where K is a constant dependent of the composition of the gas, T is the absolute temperature of the gas, and V is the acoustic velocity within the gas and is given by:

$$V=L/t \quad (2)$$

where t is the transit time for acoustic energy along the acoustic path 22.

Thus from equations (1) and (2) the temperature, T, of the gas may be described according to the equation:

$$T=C/t^2 \quad (3)$$

where C is a constant based on the composition of the gas and on the length L of the acoustic path 22.

Where the path length L is known or can by provided as an input to the calibration unit 24 then this may be employed in the calibrations unit 24, together with a known or input gas composition constant K, to determine a second reference temperature value according to equation (3) and using the signal provided by the acoustic meter 16,18,20. During the second phase the calibration unit 24 is configured to also receive an output signal from the resistance thermometer 6,10 as a second temperature measurement value and to store the two-second values also in a referenced fashion.

To increase the utility of the calibration apparatus an assumption can be made that one or both of the path length L and the gas composition (hence K) is unknown. The acoustic meter 16,18,20 is then adapted to perform a further acoustic velocity related measurement during the first phase and supply a related output signal to the calibration unit 24. The calibration unit 24 then utilizes this signal, together with the first reference temperature value, to determine the unknown value or a ratio of the unknown values using equations (1) and (2). The thus-determined parameter may then be employed by the calibration unit 24 in the determination of the second reference temperature value since the gas composition remains unchanged between the two phases of the calibration procedure.

It is particularly advantageous for the acoustic velocity related measurement to be performed as quickly as possible after introduction of the gas composition at the second temperature into the measurement cell 2 since any errors which may be introduced due to a change in the length L of the acoustic path 22 caused by thermal expansion or contraction of the measurement cell 2 as the system equilibrates can be avoided.

The calibration unit 24 is further adapted to recall the first and second reference and measurement temperature values and to perform a two point calibration of the resistance thermometer 6,10 in a known manner, for example to perform a straight line fit of the calibration points, and thereby establish a calibration relationship between reference temperatures and measurement temperatures. During use of the resistance thermometer 6,10 its output can be translated into a temperature value, for example within the calibration unit 24 using the above-mentioned established calibration relationship.

As described above, it is not necessary to have knowledge of the gas composition during the calibration procedure. It will be appreciated, however, that an output from the resistance thermometer 6,10, calibrated using the above-described apparatus and related method, may be employed together with a, preferably simultaneous, acoustic velocity related measurement signal output from the acoustic meter 16,18,20 to derive information about the composition of the gas within the measurement cell 2 using, in a known manner, the equations (1) (2) or (3) above. To this end the calibration unit 24 may be additionally programmed to perform such a derivation. Thus an accurate, relatively inexpensive, gas composition analyzer 26 having an integral resistance thermometer calibration apparatus may be provided which employs the same components for the two devices.

The exemplary embodiment of the apparatus according to the present invention is configured to perform only a two point calibration of the resistance thermometer it will be appreciated that, without departing from the inventive concept, any number of further calibration points may be provided by employing the acoustic meter 16,18,20 to generate the further reference temperature values in a manner substantially similar to that described with reference to the second phase of the calibration procedure.

Although modifications and changes may be suggested by those skilled in the art, it is the intention of the inventors to embody within the patent warranted hereon all changes and modifications as reasonably and properly come within the scope of their contribution to the art.

We claim as our invention:

1. A gas composition analyzer comprising:
   a measurement cell having an interior adapted to receive a gas composition therein;
   a resistance thermometer thermally coupled to the interior of said measurement cell;
   an acoustic meter acoustically coupled to the interior of said cell for measuring a velocity of acoustic energy transmitted between components of said acoustic meter within said cell;
   a reference thermometer thermally coupled to the interior of said cell for generating, during a calibration procedure, a first reference temperature value of said gas composition at a first temperature;
   said acoustic meter being operable during said calibration procedure to obtain an acoustic velocity-related measurement in said gas composition in said cell at a second temperature for use in generating a second reference temperature value; and
   a calibration unit supplied with said first and second temperature values and said acoustic velocity-related measurement for determining a calibration relationship for the temperature thermometer from the first and second reference temperature values and from measurement values of the first and second temperatures supplied by the resistance thermometer.

2. An analyzer as claimed in claim 1 wherein said acoustic meter is operable during said calibration procedure to obtain a further acoustic velocity-related measurement of said gas composition in said cell at the first temperature, and wherein the calibration unit generates the second reference temperature value also using the further acoustic velocity-related measurement.

3. A method for calibrating a resistance thermometer comprising the steps of:
   contemporaneously obtaining a first reference temperature value for a gas composition at a first temperature using a reference thermometer, and a first measurement temperature value of said gas composition using a resistance thermometer, and supplying said first reference temperature value and said first measurement temperature value to a calibration unit;
   contemporaneously obtaining an acoustic velocity-related measurement value of said gas composition with an acoustic meter for use in determining a second reference temperature value, and obtaining a second measurement temperature value using the resistance thermometer, and supplying said second reference temperature value and said second measurement temperature value to a calibration unit: and
   in said calibration unit, determining a relationship from the first and second temperature values and the first and second measurement values, and callibrating said resistance thermometer using said relationship.

4. A method as claimed in claim 3 comprising the additional step of using the acoustic meter to obtain an acoustic velocity-related measurement at said first temperature for use in determining said second reference temperature value.

* * * * *